United States Patent [19]

Fritz et al.

[11] 4,344,749
[45] Aug. 17, 1982

[54] INJECTION STRETCH-BLOW MOLDING APPARATUS FOR THE MANUFACTURE OF BIAXIALLY ORIENTED HOLLOW BODIES FROM THERMOPLASTIC MATERIAL

[75] Inventors: Hans-Gerhard Fritz, Uhingen; Helmut Scharrenbroich, Neunkirchen-Seelscheid, both of Fed. Rep. of Germany

[73] Assignee: Voith Fischer Kunststofftechnik GmbH & Co. KG, Fed. Rep. of Germany

[21] Appl. No.: 139,472

[22] Filed: Apr. 11, 1980

[30] Foreign Application Priority Data

Apr. 27, 1979 [DE] Fed. Rep. of Germany ....... 2917055

[51] Int. Cl.³ .............................................. B29C 17/07
[52] U.S. Cl. ................................ 425/174.4; 264/530; 264/532; 264/538; 425/526; 425/533; 425/534
[58] Field of Search ............ 425/526, 533, 534, 174.4; 264/530, 537, 538, 532

[56] References Cited

U.S. PATENT DOCUMENTS

| | | | |
|---|---|---|---|
| 3,792,946 | 2/1974 | Zauasnik | 425/533 |
| 3,819,314 | 6/1974 | Marcus | 425/533 X |
| 3,850,562 | 11/1974 | Takeuchi | 425/526 X |
| 3,870,448 | 3/1975 | Majors et al. | 425/533 |
| 3,944,643 | 3/1976 | Sato et al. | 425/526 X |
| 4,057,609 | 11/1977 | Uhlig | 264/538 X |
| 4,063,867 | 12/1977 | Janniere | 425/534 X |
| 4,065,246 | 12/1977 | Marcus | 425/533 X |
| 4,140,464 | 2/1979 | Spurr | 425/534 X |
| 4,151,247 | 4/1979 | Hafele | 425/534 |

Primary Examiner—Jan H. Silbaugh
Attorney, Agent, or Firm—Ostrolenk, Faber, Gerb & Soffen

[57] ABSTRACT

An injection stretch-blow molding apparatus is disclosed. The apparatus includes at least two preform conditioning stations, a molding injection station for initially molding the preform and a blow molding station. Each of the stations is preferably able to process an equal number of preforms at once. The apparatus also includes a turntable and preform supporting jaws connected to the turntable for transporting consecutive sets of preforms made at the injection station to the two conditioning stations alternately, and for transporting sets of preforms alternately from each of the conditioning stations to the blow molding station. This allows all four stations to operate at their respective full capacities, even though conditioning at the conditioning station requires up to twice as long as injection molding or stretch-blow molding.

21 Claims, 8 Drawing Figures

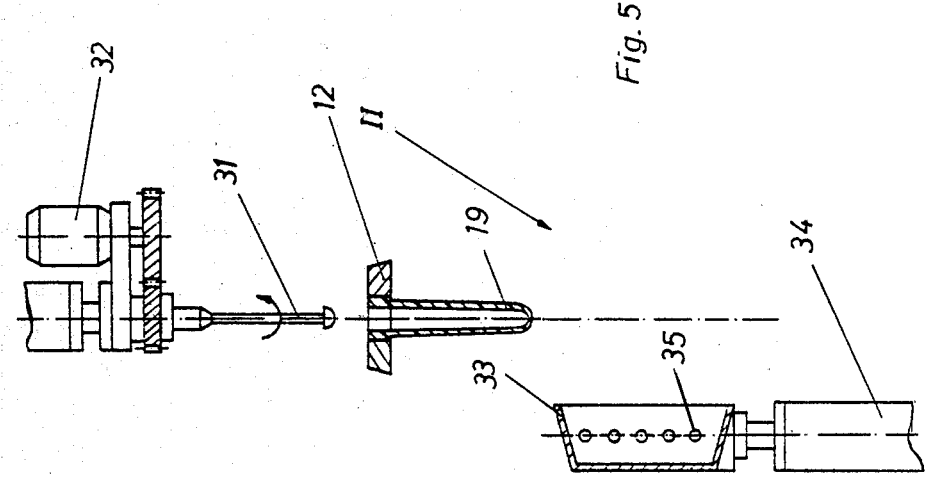
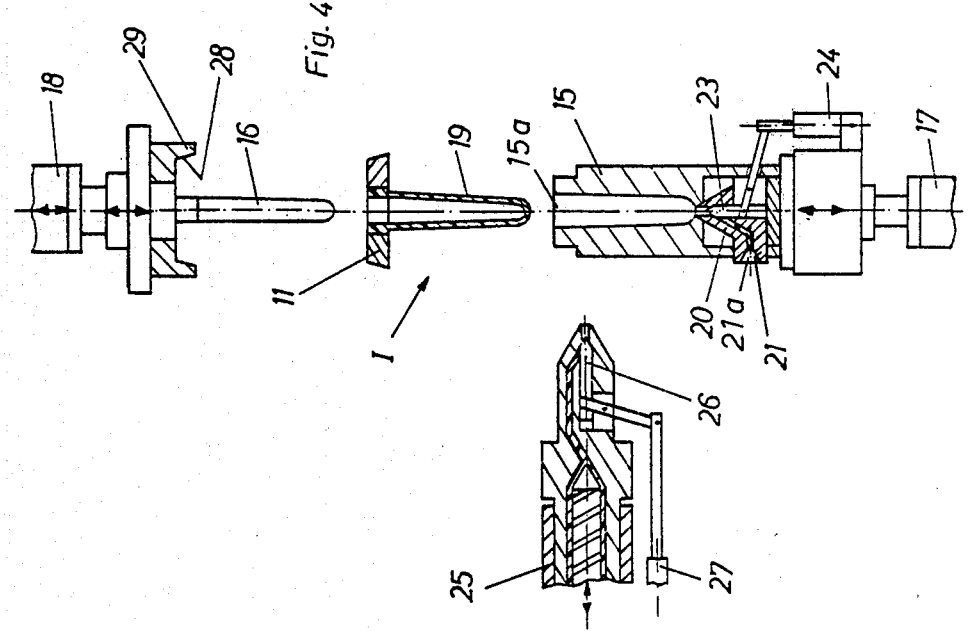

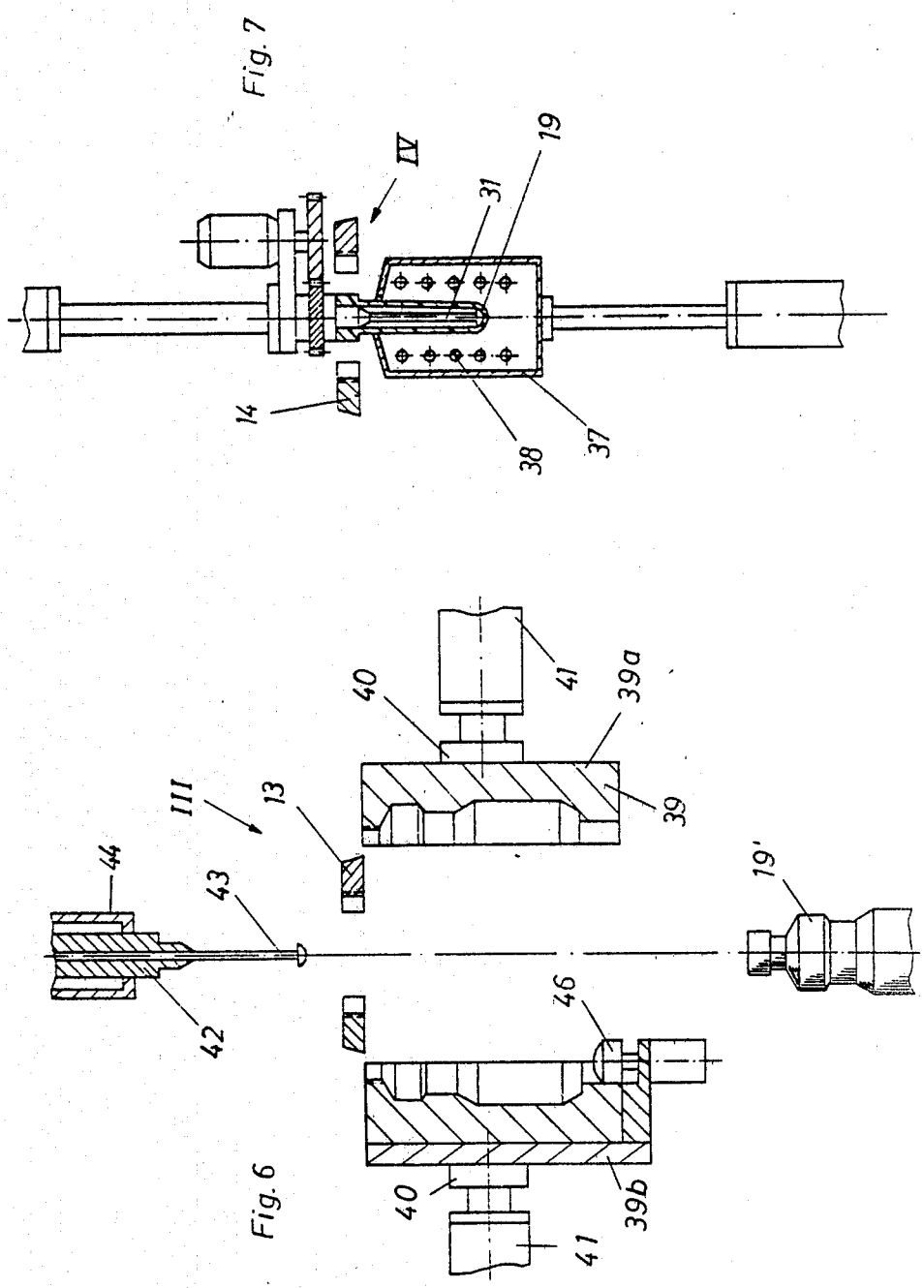

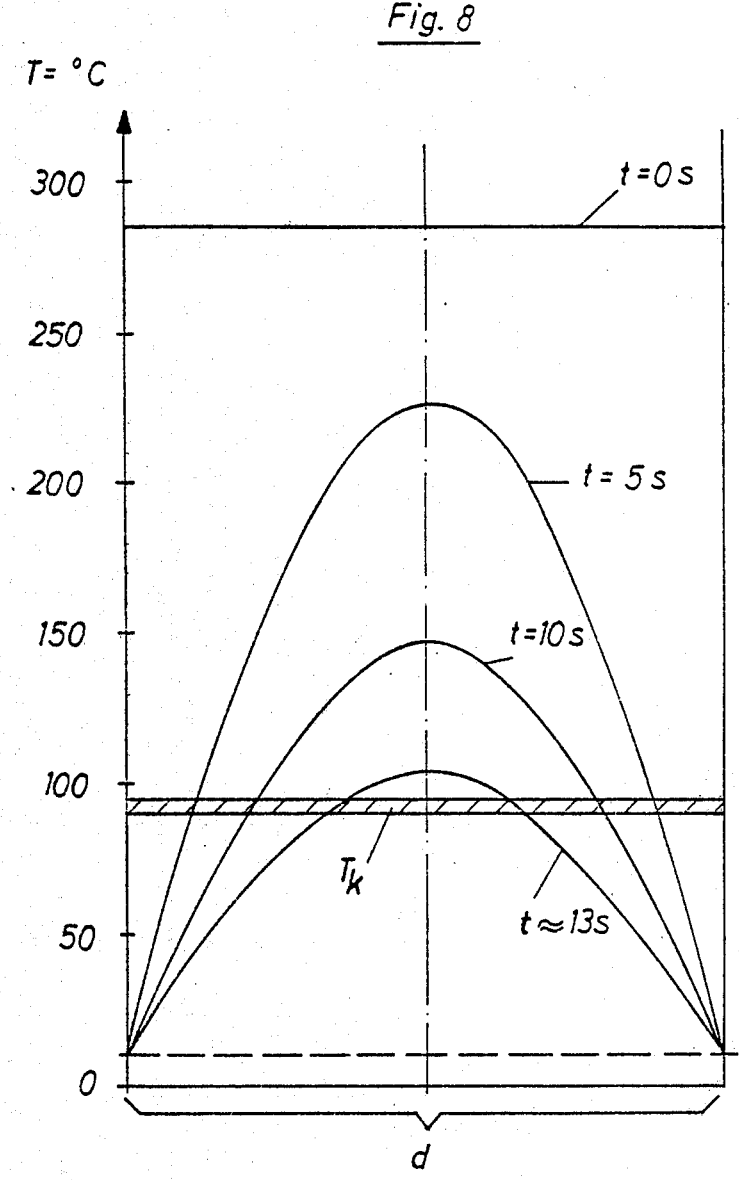

INJECTION STRETCH-BLOW MOLDING APPARATUS FOR THE MANUFACTURE OF BIAXIALLY ORIENTED HOLLOW BODIES FROM THERMOPLASTIC MATERIAL

BACKGROUND OF THE INVENTION

The present invention relates to an injection stretch-blow molding apparatus for the production of biaxially oriented hollow bodies from thermoplastic material, particularly polyester, including an injection-molding station, conditioning stations and a blow molding station, and means for transporting the performs between the individual stations.

Hollow bodies, for example bottles having threaded necks, are produced in such apparatus from injection-molded preforms. For this purpose, devices are known in which a mandrel arranged on a stepwise-rotating rotary disk passes in succession through an injection molding station, a conditioning station and a blow-stretching station, as shown in German Offenlegungsschrift No. 24 00 951. The biaxial orientation is produced by a stretching molding process which takes place within the blow mold. The preform, which has already cooled down in part at the injection molding station, must be thermally conditioned before the stretching process, i.e. it must be brought, within a relatively narrow tolerance, to a temperature suitable for the stretching process. The temperature distribution across the thickness of the wall of the preform increases quickly from the exterior boundaries of the wall to a high maximum in the center of the wall during a cooling process. But, the temperature distribution across the wall should be made as uniform as possible during the conditioning process. This is particularly necessary in the case of thick-walled preforms, such as those which must be used in the case of high stretching rates since some portion of the wall will otherwise remain outside the temperature range required for the stretching process. As a result, the cooling and conditioning times required are very large. In particular, the time necessary for the temperature-equalizing (conditioning) process in the preform wall due to slight unevennesses in temperature is up to twice the time necessary for the preform wall to cool in the mold during the injection molding process. For this reason, known injection and stretch-blowing apparatus are uneconomical, since their injection-molding and stretch-blowing stations are idle as much as half the time required for each complete cycle of the apparatus due to the time-consuming nature of the conditioning process.

SUMMARY OF THE INVENTION

The object of the present invention is to provide an injection stretch-blow molding device, which has relatively high stretching rates and uses relatively thick-walled preforms, but still makes optimal use of each of the individual stations and thus operates as economically as possible.

According to the present invention, an injection stretch-blow molding apparatus has two preform conditioning stations associated with one injection molding station. A device for transporting preforms between stations feeds the preforms from the single injection station to the two conditioning stations in alternation. Preferably, a device is also provided for the alternate feeding of the conditioned preforms from each of the conditioning stations to a single blow molding station.

Because there are two conditioning stations, the total time available for the conditioning steps is double the individual cycle time of the preform at either the injection station or the blow molding station.

In one preferred embodiment of the invention, a common turntable, which is rotatable or swingable back and forth over an angle of 90°, is employed as a common transport device between the injection station and the conditioning stations and between each of the latter and the blow station. Four pairs of jaws for grasping the preforms, for example in the region of the preform neck, are provided, approximately equally spaced about the turntable. Two pairs of the jaws are arranged 90° apart from each other, one being swingable between one conditioning station and the injection station and the other between the injection station and the other conditioning station. The other two pairs of jaws are also arranged 90° apart from each other, one being swingable between one conditioning station and the injection stretch-blowing station and the other between the other conditioning station and the injection stretch-blow molding station. The pairs of jaws preferably each serve as a part of the neck region of the injection or stretch-blowing mold. The first two pairs of jaws arranged 90° apart are therefore each alternately a part of the injection station, and the two other pairs of jaws are each alternately a part of the blow molding station.

The preforms are mounted on mandrels for each process. The mandrels are not used for transport of the preforms but are associated permanently with one station, for which they can therefore be specifically and optimally designed. This contributes to making the corresponding process more efficient.

Since the transport device in each case swings back and forth only by 90° and does not perform any vertical movements, the fluids used for cooling and for temperature conditioning the preforms can be fed directly via hoses, so that no complicated sealing problems arise. Furthermore, fewer heat expansion problems arise since the turntable is not traversed by the conditioning fluids.

Each station is preferably provided with multiple mold cavities so that it can process several preforms simultaneously.

In accordance with one advantageous further feature of the invention, the injection mold, the injection mandrel, and the associated pairs of jaws are vertically displaceable relative to each other. This permits the transverse displacement of the corresponding pairs of jaws for grasping preforms away from the injection station. The injection mandrel is preferably arranged to move upward and the mold to move downward.

For an advantageous connection of a plasticizing unit to the injection station, the injection mold preferably has a hot nozzle manifold with 90° bends and a laterally arranged nozzle channel plate. In order to permit vertical mobility of the injection mold, the plasticizing unit is displaceable about its (horizontal) axis. A needle closure valve is preferably provided in the injection mold, in the plasticizing unit, or in both.

Each of the conditioning stations may also have a respective vertically displaceable centering and spacing mandrel. In order to obtain the best possible circumferential distribution of temperature in the preform, this mandrel is preferably rotatable about its longitudinal axis.

Other objects and features of the invention, will be apparent from the following description and the accompanying drawings.

BRIEF DESCRIPTION OF THE DRAWINGS

FIGS. 4 to 7 respectively show diagrammatically the four stations of the apparatus according to the invention.

FIG. 8 is a graph of the temperature distribution across the wall thickness of the hollow preform during cooling.

DETAILED DESCRIPTION OF THE INVENTION

Figure 1:
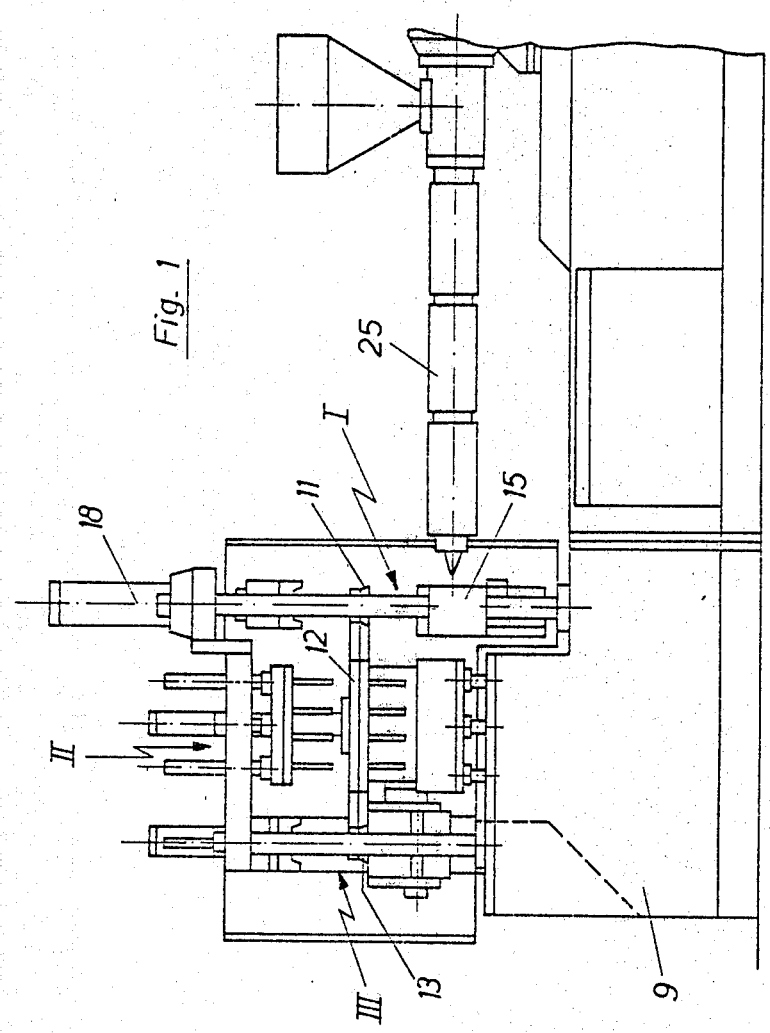
FIG. 1 shows an apparatus in accordance with the invention in elevation.
Figure 2:
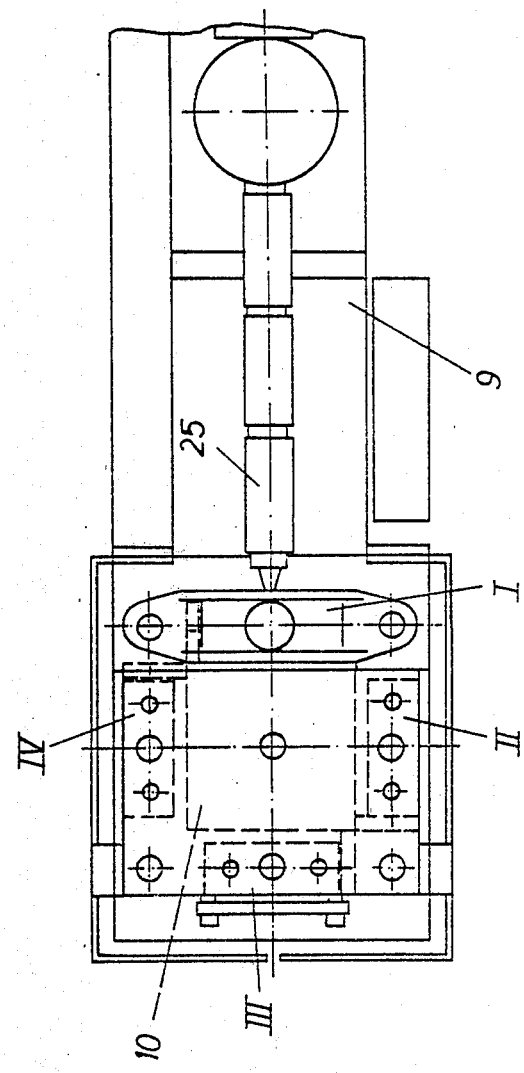
FIG. 2 is a top view of the apparatus of FIG. 1.
Figure 3:
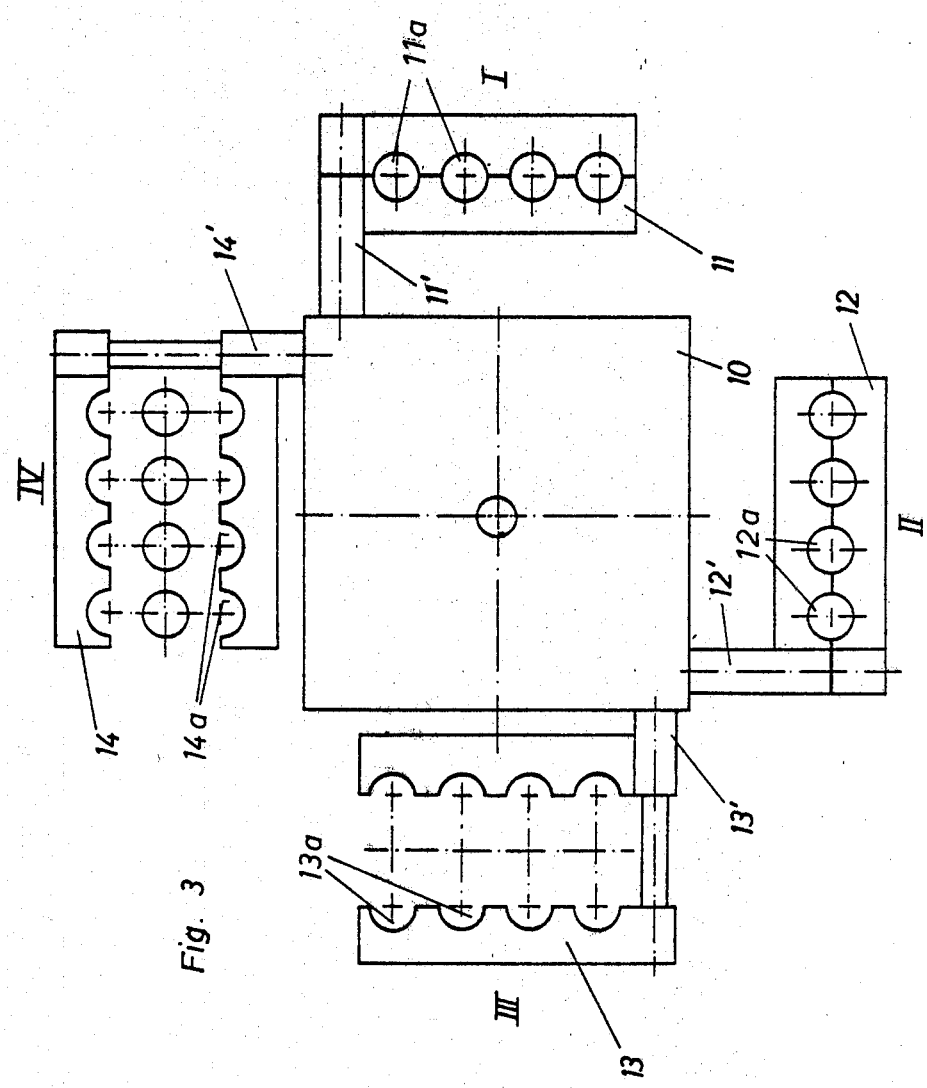
FIG. 3 shows a diagrammatic top view of the turntable with the gripping jaws.

In FIGS. 1 to 3, a turntable 10 is supported on the machine frame 9. The turntable 10 is rotatable on the frame about its center, back and forth, between the position shown and a position 90° in the clockwise direction therefrom, as shown in FIG. 3, by means of a known indexing mechanism (not shown). As shown in FIG. 3, pairs of clamping jaws 11, 12, 13 and 14 are fastened by arms 11', 12', 13' and 14', respectively, to the turntable 10, with which they are rotatable. The arms 11', 12', 13' and 14' are each on a respective side of the square shaped turntable 10. At least jaws 11 and 14 are designed to be quickly cooled by means of known cooling means (not shown). As indicated in FIG. 3, the individual pairs of jaws carry out a linear opening and closing movement in a known manner. In FIG. 3, jaws 13 and 14 are shown open and jaws 11 and 12 are shown closed. The drive mechanisms for this jaw movement are also known and have been omitted.

Around the periphery of the turntable 10 are arranged four stations, namely the injection station I, which is shown adjacent jaws 11 in FIG. 3, conditioning stations II and IV on the sides of turntable 10 that are 90° away from the side at the injection station I, and the stretch-blowing station III located opposite station I. The pair of jaws 11 is thus rotatable between the injection station I and the conditioning station II, the pair of jaws 12 between the conditioning station II and the blow molding station III, the pair of jaws 13 between the blow molding station III and the conditioning station IV, and the pair of jaws 14 between the conditioning station IV and the injection station I.

In the embodiment shown, the injection mold 15 has four molding cavities 15a. The mold 15 is disposed at the injection station I (FIG. 4). An injection mandrel 16 is associated with each molding cavity. Each pair of jaws 11–14 has respective apertures 11a–14a, equal in number to the molding cavities 15a. The pairs of jaws 11 and 14 alternately form a part of the injection mold for the development of the neck region of the preform in a manner to be explained below.

As shown in FIG. 4, the injection mold 15 is moved downward by means of a hydraulic motor 17, and the injection mandrel 16 corresponding to each mold cavity 15a is raised by means of a second hydraulic motor 18. This frees a preform 19 which has just been completed for transport by the pair of jaws 11 to the conditioning station II. Attached to the injection mold 15 is a hot nozzle manifold 20 with an integrated 90° elbow and a laterally arranged nozzle channel plate 21. The surfaces of the hot nozzle manifold 20 and mold 15 that rest on each other are made as small as possible for as nearly absolute heat separation of manifold 20 and mold 15 as possible in order to avoid recrystallization brought about by such processes as the undercutting of the surfaces or by the formation of a ceramic layer. Each individual cavity 15a of the mold 15 is adapted to be closed by a separate needle closure nozzle 23. The nozzles 23 are jointly actuatable by a servomotor 24.

There is a plasticizing unit 25, which is also supported on the machine frame 9 (FIGS. 1 and 2). It is developed for slight displacement along its axis so that it can be moved sufficiently far from the injection mold 15 to allow the latter to be moved vertically. The plasticizing unit 15 also has a needle closure nozzle 26 which is actuated by a servomotor 27.

Above the injection mold 15, there are mandrels 16, which move vertically into the injection cavity 15a. There are centering cones 28 and fitting ledges 29 for centering and for transmitting the force from servomotor 18 for closing and clamping the injection molds 15. The injection molding cavities 15a, pairs of jaws 11–14 and injection mandrels 16 are preferably cooled by means of cold water or some other fluid, for instance nitrogen, moving in a closed circuit, as is known in the art. Since the injection mandrels 16 are used solely for injection and perform no other function, they can be designed specifically and optimally for this purpose, in particular with respect to their cooling. They may be equipped with a known hydraulically actuatable stripper plate (not shown). The cooling process will be explained with reference to the diagram of FIG. 8.

In FIG. 8, the temperature T (ordinate) is plotted as a function of the wall cross-section or thickness d (abscissa) of the molded preforms after various cooling times t. Following the injection molding of the preform in a cavity 15a, at the start t=0 of the cooling, the temperature is about 285° C. uniformly over the entire wall thickness of the preform. After about 10 seconds there is established a V-shaped temperature distribution across the thickness dimension of the wall, shown approximately by the curve t=10 s. At the two outer surfaces of the wall the temperature is then about 10° C., i.e. approximately the same as that of the coolant, while in the middle, the wall is still at about 145° C. The purpose of the conditioning station is to make the temperature of the preform uniform over the wall thickness, approximately within the hatched temperature band $T_k$ between 90° and 95° C. In this connection, the cold outer surface layers of the preform wall are heated while the internal heat flows away from the center of the wall toward the outside surfaces. This relatively slow process of establishing a uniform temperature across the preform wall thickness need not be completed in the length of time required for one cycle of the injection-molding process. It can instead extend over two successive cycles. Because of the inclusion of two conditioning stations in accordance with the invention, the output of the apparatus of the invention is not reduced despite the conditioning requiring two cycles.

The conditioning stations will be explained with reference to FIGS. 5 and 7. FIG. 5 shows the conditioning station II. A preform 19 which has just been completely conditioned is held by the pair of opposed jaws 12. A plurality, e.g. four, of the preforms 19 may be held and each is treated simultaneously. For this purpose, there are the same elements of the conditioning station for each preform of the plurality. The centering and spacing mandrel 31, which can be introduced tightly into the neck region of the preform 19, can be cooled at the places where it contacts the neck of preform 19, but may be provided with means for heating all other parts of the interior of the preform 19. By means of a motor drive 32, the mandrel 31 can be placed in rotation with adjustable speed. If the molded product is to have a thread, for example in the neck region, it is necessary to be able to stop the rotation of mandrel 31 in a reproducible position.

The conditioning station II includes a conditioning chamber 33 which can be raised into position at the height of the preform 19 by means of a servomotor 34. The conditioning chamber 33 extends along all of the preforms 19 which are suspended in a row from jaws 12. The chamber includes horizontally arranged, rod or strip-shaped, infra-red (IR) radiators 35 which apply heat to the preforms 19. Since IR radiators 35 can be independently controlled, the heat supplied to the preforms 19 can be varied along the length of each preform 19 if desired. In FIG. 5 a chamber 33 is shown only at one side of the preforms 19. On the opposite sides of the preforms, an identical chamber or a reflector (not shown) can be provided.

FIG. 7 shows an alternative embodiment of a conditioning station. It is at the other conditioning station IV. The opposed jaws 14 are shown open and the mandrels 31 are in place in the preforms 19. There is a generally pot-shaped conditioning chamber 37 with annular on ring shaped IR radiators 38. A separate chamber 37 is provided for each preform 19.

The stretch-blow mold 39 is shown in FIG. 6. The mold halves 39a, 39b are fastened in a known manner to mold carrier plates 40 and are opened and closed by means of servomotors 41. In this embodiment, the opposed jaws 13 form a part of the mold. The vertically movable blow mandrels 42 are coaxial with stretch mandrels 43 and stripper sleeves 44 for the completely blown hollow bodies 19'. The bottoms of the blow molds 39 are core-pull mold bottoms 46 for the development of so-called cam bottoms.

The apparatus operates in four cycles, as follows. In cycle a, preforms 19 are injected at station I in mold cavities 15a. Each aperture 11a in jaws 11 cooperates with the corresponding mold cavity 15a to define the shape of the neck portion of a preform. Immediately before the end of the cooling time, the plasticizing unit 25 is removed from the nozzle 21a in the nozzle channel plate 21. The injection mold 15 and hot nozzle manifold 20 are then moved downward until the upper edge of the mold 15 has cleared the preform 19. The injection mandrels 16 are loosened and removed from the preforms 19, for example by means of known stripper plates (not shown). FIG. 4 shows the injection station I at this point in the operation.

In cycle b, the preforms 19 which have just been injection molded are transported by jaws 11 through a 90° swing of the turntable 10 in the clockwise direction to the conditioning station II. This same swing of turntable 10 moves jaws 14, which are open, as will be explained below, into station I. While the jaws 14 are at station I, they are closed and another set of preforms is injection molded, using jaws 14 as part of the mold in the same manner as jaws 11 were used in cycle a. At station II, centering and spacer mandrels 31 are inserted from above into the preforms 19 and are exactly centered within each preform 19. A conditioning unit 33 or 37 is moved from below into position beside or surrounding the preforms 19, respectively. Jaws 11 open and the centering mandrels 31 begin to rotate, and the IR radiators 35 or 38 condition the preforms 19 as described above. At the end of the cycle b, open jaws 11 and closed jaws 14 swing back again counterclockwise by 90° to the stations I and IV, respectively. During this movement, the jaws 11 remain open while the jaws 14, carrying newly injection molded preforms, remain closed. The set of preforms 19 that were brought to station II by now open jaws 11 remain on the mandrels 31 at station II.

Cycle c begins, and a new set of preforms is now produced at station I with jaws 11. At the same time, the conditioning stage commences at station IV for the preforms 19 that were molded with jaws 14 in cycle b. Jaws 14 open during the conditioning at station IV.

The 90° return swing at the end of cycle b moves jaws 12, which are open, to station II, where they remain open while the preforms 19 on mandrels 31 continue being conditioned. Shortly before the end of cycle c, the rotation of the centering and conditioning mandrels 31 of the conditioning device at station II is stopped, in such a manner as to give the preforms 19 mounted thereon a selected final orientation. Jaws 12 are then closed, while the conditioning unit 33 or 37 is lowered. The centering mandrels 31 are removed from the preforms 19.

At the end of cycle c, the turntable 10 is again swung by 90° clockwise. In this way the preforms 19 that have been completely conditioned at station II are transported by jaws 12 to the stretch-blow molding station III, while open jaws 13 pass to station IV and wait there for the preforms molded in cycle b.

In the final cycle d, the blow-mold halves 39a, 39b at station III close around the conditioned preforms. The jaws 12 open. The combined blow and stretch mandrels 42–43 move from above into the preforms. After a short pre-blowing process, the mechanical axial stretching process is performed, followed by the main blowing process, which is carried out by means of high pressure.

The stretched and blown biaxially oriented hollow bodies 19' cool down in the blow mold 39 very rapidly due to the thinness of their walls and the small amount of cooling to be done (from a temperature of about 95° C. to 30° C.). After the cooling, the stretch mandrels 43 are removed from the hollow bodies 19' and the blow mold 39 opens. Jaws 13 open and the hollow bodies 19' hanging from the blow mandrels 42 are removed therefrom by means of stripper sleeves 44. The stretch-blown bottles 19' of polyester, for example, drop between the open blow mold halves 39a, 39b into transport pipes (not shown) which transport them pneumatically to a bin (not shown). The preforms which were injection molded in cycle b and which have now been completely conditioned at station IV are now moved to the blow mold station III, while jaws 11 are ready at station I to participate in molding a new set of preforms.

The present invention may be embodied in other specific forms without departing from the spirit or essential attributes thereof and, accordingly, reference should be made to the appended claims, rather than to the foregoing specification, as indicating the scope of the invention.

What is claimed is:

1. An injection stretch-blow molding apparatus, comprising:
    an injection molding station for injection molding plastic preforms, first and second conditioning stations including means for affecting the condition of injection molded preforms, and a blow mold station for stretch-blowing preforms which have been conditioned at one of the conditioning stations;

rotary transport means for transporting preforms injection molded at the injection molding station to the other stations; and the transport means being circularly movable back and forth alternately in two opposite directions, and including means for transporting injection molded preforms to the first conditioning station and for simultaneously carrying other preforms from the first conditioning station to the blow mold station while moving in a first circular direction, and including means for transporting preforms from the injection molding station to the second conditioning station and for simultaneously transporting other preforms from the second conditioning station to the blow mold station while moving in the opposite direction.

2. The apparatus of claim 1, wherein the transport means comprises a rotatable device for rotatively transporting the preforms between the stations.

3. The apparatus for claim 2, wherein the transport means further comprises respective sets of jaws, each for supporting a preform; a respective set of the jaws corresponding to each respective station, the jaws being for carrying supported preforms between said stations; each of the sets of jaws comprising a pair thereof which define between them at least one aperture, and the pair of jaws supporting a preform in a respective one of the apertures thereof; and means for cooling at least some of the sets of jaws.

4. The apparatus of claim 1, wherein the stations are adjacent to and generally equiangularly spaced around the rotatable device; the injection molding station and the blow molding station being each rotatively next adjacent to both of the conditioning stations in the rotation directions of the rotatable device.

5. The apparatus of claim 4, wherein the stations are so placed that rotation of the rotatable device in one direction moves a preform at the injection molding station to the first conditioning station and rotation of the rotatable device in the opposite direction moves a preform at the injection molding station to the second conditioning station.

6. The apparatus of claim 5, wherein the stations are so placed that rotation of the rotatable device in one direction moves a preform at the first conditioning station to the blow molding station and rotation of the rotatable device in the opposite direction moves a preform at the second conditioning station to the blow molding station.

7. The apparatus of claim 4, wherein the transport means further comprises respective sets of jaws each for supporting a preform; a respective set of jaws corresponding to each respective station; all of the sets of jaws being corotatable with the rotatable device; the jaws being for carrying supported preforms between stations; the rotatable device being rotatable between a first position, wherein each of the sets of jaws is adjacent a respective one of the stations, and the second position which is 90° rotated from the first position and wherein each of the sets of jaws is adjacent another of the stations; the rotatable device being rotatable to return 90° from the second position to the first position.

8. The apparatus of claim 1, wherein the blow molding means comprises a combined blow-stretch mandrel for acting on a conditioned preform; said blow-stretch mandrel having a stripper sleeve for removing a completely blown hollow body from the blow-stretch mandrel.

9. The apparatus of claim 1, wherein the injection molding means comprises an injection mold cavity and in injection mandrel and wherein a preform is molded at the injection molding station by injection molding of a plastic material in the injection mold cavity while the injection mandrel is located in the injection mold cavity; the injection mold cavity and injection mandrel being separable after injection molding of a preform; said transport means including jaw means for supporting and moving preforms molded at the injection molding station to each of the conditioning stations.

10. The apparatus of claim 9, wherein the means for separating the injection mandrel and the cavity comprises means for moving that mandrel between a first position nearer to the jaw means and a second position further from the jaw means and for moving the injection mold cavity between a third position nearer to the jaw means and a fourth position farther therefrom.

11. The apparatus of claim 10, wherein the injection mandrel includes a centering cone for engaging the jaw means when the injection mandrel is in the first position thereof.

12. The apparatus of claim 9, wherein the injection molding means includes a hot nozzle manifold with a 90° bend and a laterally arranged die channel plate for a plasticizing unit communicating with the cavity.

13. The apparatus of claim 12, wherein the injection station further comprises a plasticizing unit for plasticizing the material in the mold, the plasticizing unit being displaceable toward and away from the injection mold cavity.

14. The apparatus of claim 1, wherein each of the stations includes a respective displaceable mandrel not movable to others of the stations and means for displacing that mandrel to and away from a preform at the respective station, respectively for engaging the mandrel with the preform, and for disengaging the mandrel from the preform when the preform is to be moved to another station.

15. The apparatus of claim 14, wherein the ones of the mandrels included in the conditioning stations are each rotatable about a respective longitudinal axis and include means for cooling; and further comprises means at the conditioning stations for rotating the respective mandrels there.

16. The apparatus of claim 1, wherein each conditioning station comprises a respective chamber for containing a preform while the preform is being conditioned, and further includes heat radiator means; and means for moving a preform into and out of the chamber.

17. The apparatus of claim 16, wherein the heat radiator means is annular and is shaped to encircle one preform.

18. The apparatus of claims 16 or 17, wherein each chamber includes a plurality of the heating rods arranged in the respective chamber along the length of the preform in the chamber; each of the heating rods being operable with a variable output that is adjustable independently of the others of the heating rods; and means for effecting such adjustment.

19. The apparatus of either of claims 16 or 17, wherein each chamber includes a plurality of the heat radiator means arrayed in the respective chamber along the length of the preform in the chamber; each of the heat radiator means being operable with a variable output that is adjustable independently of the others of said heat radiator means; and means for effecting such adjustment.

20. The apparatus of claim 1, wherein the conditioning stations are arranged symmetrically with respect to the injection molding station.

21. The apparatus of claim 20, wherein the transport means comprises a rotatable device for rotatively transporting the preforms between the stations.

* * * * *